United States Patent
Paranjape et al.

(10) Patent No.: US 11,374,375 B2
(45) Date of Patent: Jun. 28, 2022

(54) LASER CLOSED POWER LOOP WITH AN ACOUSTO-OPTIC MODULATOR FOR POWER MODULATION

(71) Applicant: KLA Corporation, Milpitas, CA (US)

(72) Inventors: Mandar Paranjape, Cupertino, CA (US); Steve Yifeng Cui, Fremont, CA (US); Anatoly Romanovsky, Palo Alto, CA (US); Million Daniel, Milpitas, CA (US); Nadine Asenbaum-Doerre, Palo Alto, CA (US); Jeff Chen, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 152 days.

(21) Appl. No.: 16/988,443

(22) Filed: Aug. 7, 2020

(65) Prior Publication Data

US 2021/0050700 A1    Feb. 18, 2021

Related U.S. Application Data (60) Provisional application No. 62/886,477, filed on Aug. 14, 2019.

(51) Int. Cl.
*H01S 3/10*    (2006.01)
*H01S 3/00*    (2006.01)
(Continued)

(52) U.S. Cl.
CPC .......... *H01S 3/0085* (2013.01); *H01S 3/1068* (2013.01); *G02B 26/0883* (2013.01);
(Continued)

(58) Field of Classification Search
CPC .... H01S 3/1068; H01S 3/0085; H01S 3/0078; H01S 3/005; H01S 3/0092
See application file for complete search history.

(56) References Cited

U.S. PATENT DOCUMENTS 7,788,629 B2    8/2010    Zurbrick et al.
8,755,044 B2    6/2014    Reich et al.
(Continued)

FOREIGN PATENT DOCUMENTS

KR    20100137794 A    12/2010
WO    2005121889 A2    12/2005

OTHER PUBLICATIONS

G. Spirou et al., "A high-speed-modulated retro-reflector for lasers using an acousto-optic modulator," Canadian Journal of Physics, 2003, 81(4): 625-638.
(Continued)

*Primary Examiner* — Kinam Park
(74) *Attorney, Agent, or Firm* — Huse IP Law; Charles C. Huse (57) ABSTRACT

A laser-beam power-modulation system includes an acousto-optic modulator (AOM) to receive a laser beam and separate the laser beam into a primary beam and a plurality of diffracted beams based on an input signal. The power of the primary beam depends on the input signal. The system also includes a slit to transmit the primary beam and dump the plurality of diffracted beams, a controller to generate a control signal based at least in part on feedback indicative of the power of the primary beam or the power of a beam generated using the primary beam, and a driver to generate the input signal based at least in part on the control signal.

25 Claims, 6 Drawing Sheets

(51) Int. Cl.
*H01S 3/106* (2006.01)
*G02F 1/33* (2006.01)
*H01S 3/08* (2006.01)
*G02B 26/08* (2006.01)

(52) U.S. Cl.
CPC ............... *G02F 1/33* (2013.01); *H01S 3/005* (2013.01); *H01S 3/0071* (2013.01); *H01S 3/0078* (2013.01); *H01S 3/0092* (2013.01); *H01S 3/08004* (2013.01)

(56) References Cited

U.S. PATENT DOCUMENTS

| | | | |
|---|---|---|---|
| 8,767,291 B2 | 7/2014 | Tsigutkin | |
| 2002/0005396 A1* | 1/2002 | Baird | B23K 26/0604 |
| | | | 257/E23.15 |
| 2005/0270631 A1* | 12/2005 | Johnson | H01S 3/117 |
| | | | 359/305 |
| 2014/0204963 A1 | 7/2014 | Chuang et al. | |
| 2015/0014286 A1 | 1/2015 | Staupendahl | |
| 2017/0050266 A1* | 2/2017 | Mueller | H01S 3/2232 |
| 2017/0131617 A1* | 5/2017 | Hua | B23K 26/064 |
| 2018/0038803 A1 | 2/2018 | Cui et al. | |
| 2018/0173027 A1* | 6/2018 | Morse | G02F 1/113 |

OTHER PUBLICATIONS

Gooch & Housego, "QCXXX-YYDC-ZZZ-AAV Compact Low Power RF Driver," Apr. 16, 2018.
PCT/US2020/046256, International Search Report, dated Nov. 26, 2020.
PCT/US2020/046256, Written Opinion of the International Searching Authority, dated Nov. 26, 2020.

* cited by examiner

LASER CLOSED POWER LOOP WITH AN ACOUSTO-OPTIC MODULATOR FOR POWER MODULATION

RELATED APPLICATION

This application claims priority to U.S. Provisional Patent Application No. 62/886,477, filed on Aug. 14, 2019, which is incorporated by reference in its entirety for all purposes.

TECHNICAL FIELD

This disclosure relates to laser power control, and more specifically to using an acousto-optic modulator (AOM) for laser power modulation.

BACKGROUND

As semiconductor design rules tighten, the sizes of defects shrink accordingly. A defect inspection tool, which is also referred to as a particle inspection tool or simply an inspection tool, should be capable of detecting small particles in advanced design layers (e.g., design layers with the tightest design rules). For laser-scattering-based inspection tools, laser power-density requirements will keep increasing to allow detection of smaller and smaller particles. New inspection tools therefore have higher laser powers and smaller focus-spot sizes.

High-power lasers used in inspection tools typically have two or three harmonic frequency-conversion stages. These lasers typically operate at constant power: a closed control loop changes input-stage power to keep the power output of the final frequency-conversion stage constant. The input-stage power is changed, and the power output is accordingly held constant, by changing the current in pump diodes or attenuating the power using a combination of a half-wave plate on a motorized rotary mount and a polarized beam cube. In the first case, the pump diode current on the fundamental wavelength of an Nd:YAG or Nd:YV04 laser is changed to change the input-stage power. This change has an associated settling time that negatively impacts system operation. In the second case, the half-wave plate is rotated to change the input-stage power. The reliability of the motorized rotary mount that rotates the half-wave plate limits overall system reliability, however, and moving parts are undesirable.

SUMMARY

Accordingly, there is a need for improved systems and methods for controlling laser power.

In some embodiments, a laser-beam power-modulation system includes an acousto-optic modulator (AOM) to receive a laser beam and separate the laser beam into a primary beam and a plurality of diffracted beams based on an input signal. The power of the primary beam depends on the input signal. The system also includes a slit to transmit the primary beam and dump the plurality of diffracted beams, a controller to generate a control signal based at least in part on feedback indicative of the power of the primary beam or the power of a beam generated using the primary beam, and a driver to generate the input signal based at least in part on the control signal.

In some embodiments, a laser-beam power-modulation method includes separating a laser beam into a primary beam and a plurality of diffracted beams using an AOM. The power of the primary beam depends on an input signal from a driver. The method also includes dumping the plurality of diffracted beams while transmitting the primary beam, generating a control signal based at least in part on feedback indicative of the power of the primary beam or the power of a beam generated using the primary beam, providing the control signal to the driver, and generating the input signal based at least in part on the control signal, using the driver.

BRIEF DESCRIPTION OF THE DRAWINGS

For a better understanding of the various described implementations, reference should be made to the Detailed Description below, in conjunction with the following drawings. The drawings may not be to scale.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
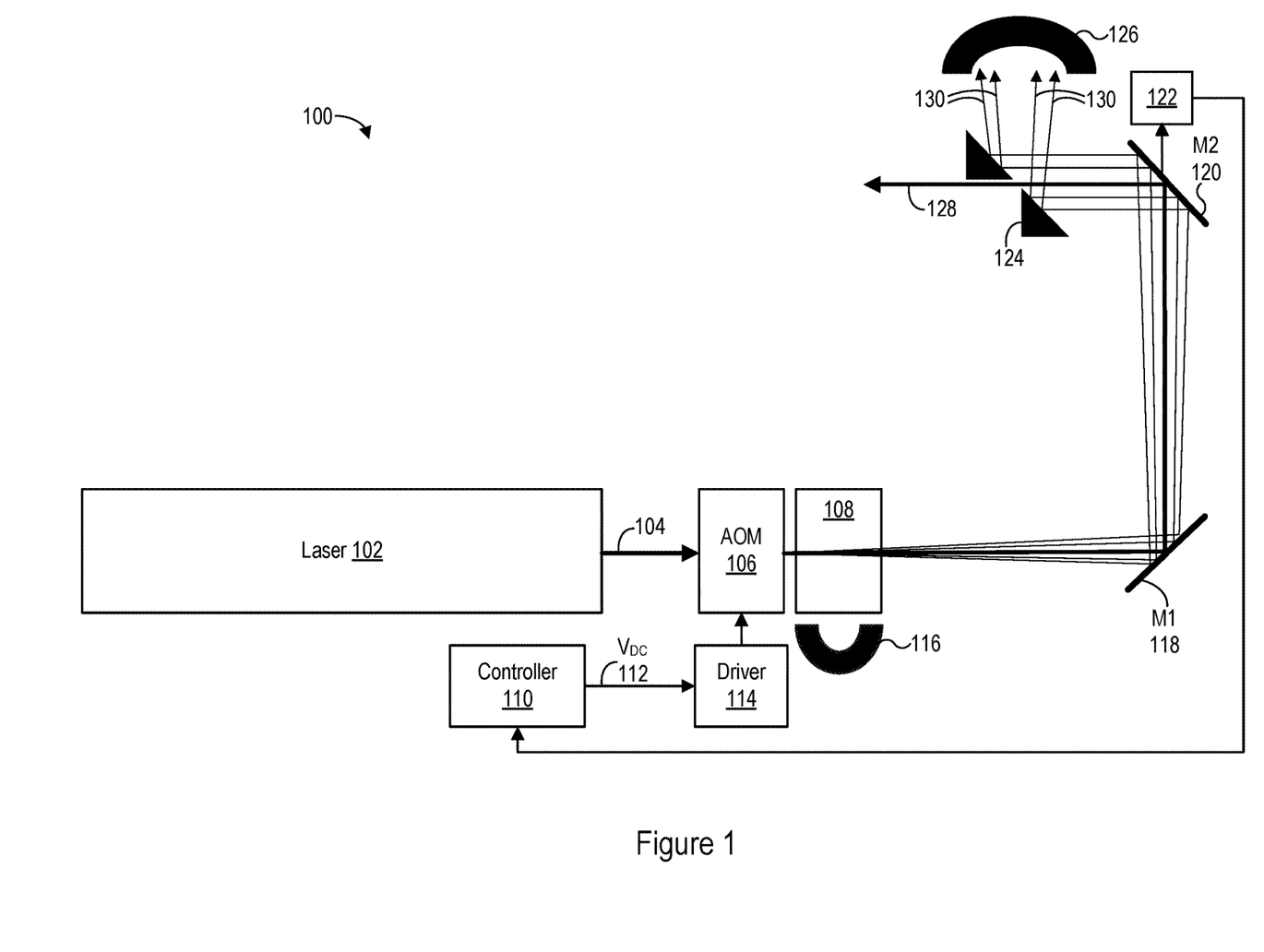
FIG. 1 is a diagram showing a laser-beam power-modulation system with an acousto-optic modulator (AOM) in accordance with some embodiments.

FIG. 1 is a diagram showing a laser-beam power-modulation system 100 in accordance with some embodiments. The system 100 includes a laser 102 that generates a laser beam 104. In some embodiments, the laser 102 is a green laser and the laser beam is green (e.g., has a frequency in the range of 500-565 nm). For example, the laser 102 is a mode-locked laser at 532 nm. In some embodiments, the laser 102 includes a laser cavity and a second harmonic generator (SHG) that doubles the frequency of laser light from the laser cavity. For example, the laser cavity includes an Nd:YVO4 crystal that lases at a fundamental wavelength of 1064 nm and the SHG converts the 1064 nm light to 532 nm light, resulting in the laser beam 104.

An acousto-optic modulator (AOM) 106 receives the laser beam 104 and separates the laser beam 104 into a primary beam 128 (i.e., a zeroth-order beam) and a plurality of diffracted beams 130 (e.g., +/−1 diffraction-order beams, +/−2 diffraction-order beams, etc.), based on an input signal received from a driver 114. The AOM 106 performs this separation by diffracting a portion of the laser beam 104 into the diffracted beams 130, based on the input signal from the driver 114. The power of the primary beam 128 is thus less than the power of the laser beam 104 when the AOM 106 is operating. The input signal specifies the magnitude of the diffraction performed by the AOM 106, and thereby specifies the amount of separation that is performed.

In some embodiments, the driver 114 is a radio-frequency (RF) driver and the input signal is an RF signal. The power of the primary beam 128 depends on the input signal, as does the power of the plurality of diffracted beams 130. For example, increasing the RF power of the input signal increases the diffraction performed by the AOM 106 and thereby decreases the power of the primary beam 128: more of the laser beam 104 is diffracted into the plurality of diffracted beams 130. Similarly, decreasing the RF power of the input signal decreases the diffraction performed by the AOM 106 and thereby increases the power of the primary beam 128: less of the laser beam 104 is diffracted into the plurality of diffracted beams 130.

A slit 124 acts as a filter that transmits the primary beam 128 and dumps (i.e., filters out) the plurality of diffracted beams 130. In some embodiments, the slit 124 includes a pair of mirrors with a gap between them. The gap transmits the primary beam 128 (i.e., the primary beam 128 passes through the gap), while the mirrors reflect the plurality of diffracted beams 130 to a beam dump 126.

In some embodiments, one or more mirrors direct the primary beam 128 and the plurality of diffracted beams 130 toward the slit 124. In the example of FIG. 1, the one or more mirrors include a first mirror (M1) 118 and a second mirror (M2) 120. The first mirror 118 reflects the primary beam 128 and the plurality of diffracted beams 130, directing them toward the second mirror 120. The second mirror 120 reflects the primary beam 128 and the plurality of diffracted beams 130, directing them toward the slit 124. The first mirror 118 and second mirror 120 are situated between the AOM 106 and the slit 124 along the optical paths of the primary beam 128 and the plurality of diffracted beams 130. The first mirror 118 is situated between the AOM 106 and the second mirror 120 along the optical paths of the primary beam 128 and the plurality of diffracted beams 130.

In some embodiments, the system 100 further includes an attenuator 108 to attenuate the primary beam 128. The attenuator 108 may also attenuate the plurality of diffracted beams 130. For example, the attenuator 108 directs some of the light from the primary beam 128 and the plurality of diffracted beams 130 to a beam dump 116. The attenuator 108 may be positioned between the AOM 106 and the one or more mirrors that direct the primary beam 128 and the plurality of diffracted beams 130 toward the slit 124. For example, the attenuator 108 is situated between the AOM 106 and the first mirror 118.

In some embodiments, a sensor 122 (e.g., green sensor 502, FIG. 5) receives light from the primary beam 128 leaked by a respective mirror of the one or more mirrors. The respective mirror reflects the primary beam 128 but is not perfect, and thus leaks (i.e., transmits) some light from the primary beam 128. In the example of FIG. 1, the respective mirror is the second mirror 120: light from the primary beam 128 leaks through the second mirror 120 and is provided to the sensor 122. The sensor 122 may include an aperture (e.g., aperture 504, FIG. 5) to filter out light from the plurality of diffracted beams 130 that leaks through the second mirror 120, such that the sensor 122 only senses light from the primary beam 128. The power of the light leaked by the respective mirror and sensed by the sensor 122 is related to (e.g., is a percentage of) the power of the primary beam 128. By sensing this light, the sensor 122 generates feedback indicative of the power of the primary beam 128 and provides this feedback to a controller 110.

The controller 110 (e.g., a microcontroller) generates a control signal 112 based at least in part on the feedback from the sensor 122. In some embodiments, the controller 110 filters noise (e.g., kilohertz-scale noise) from the feedback in the process of generating the control signal 112. The controller 110 provides the control signal 112 to the driver 114, which generates the input signal provided to the AOM 106 based at least in part on the control signal 112. For example, the control signal 112 specifies the RF power of the input signal. In some embodiments, the control signal 112 is a DC voltage (VDc) provided to an input of the driver 114.

The laser beam 128, as transmitted by the slit 124, may be provided to subsequent optical components for use in an optical system.

Figure 2:
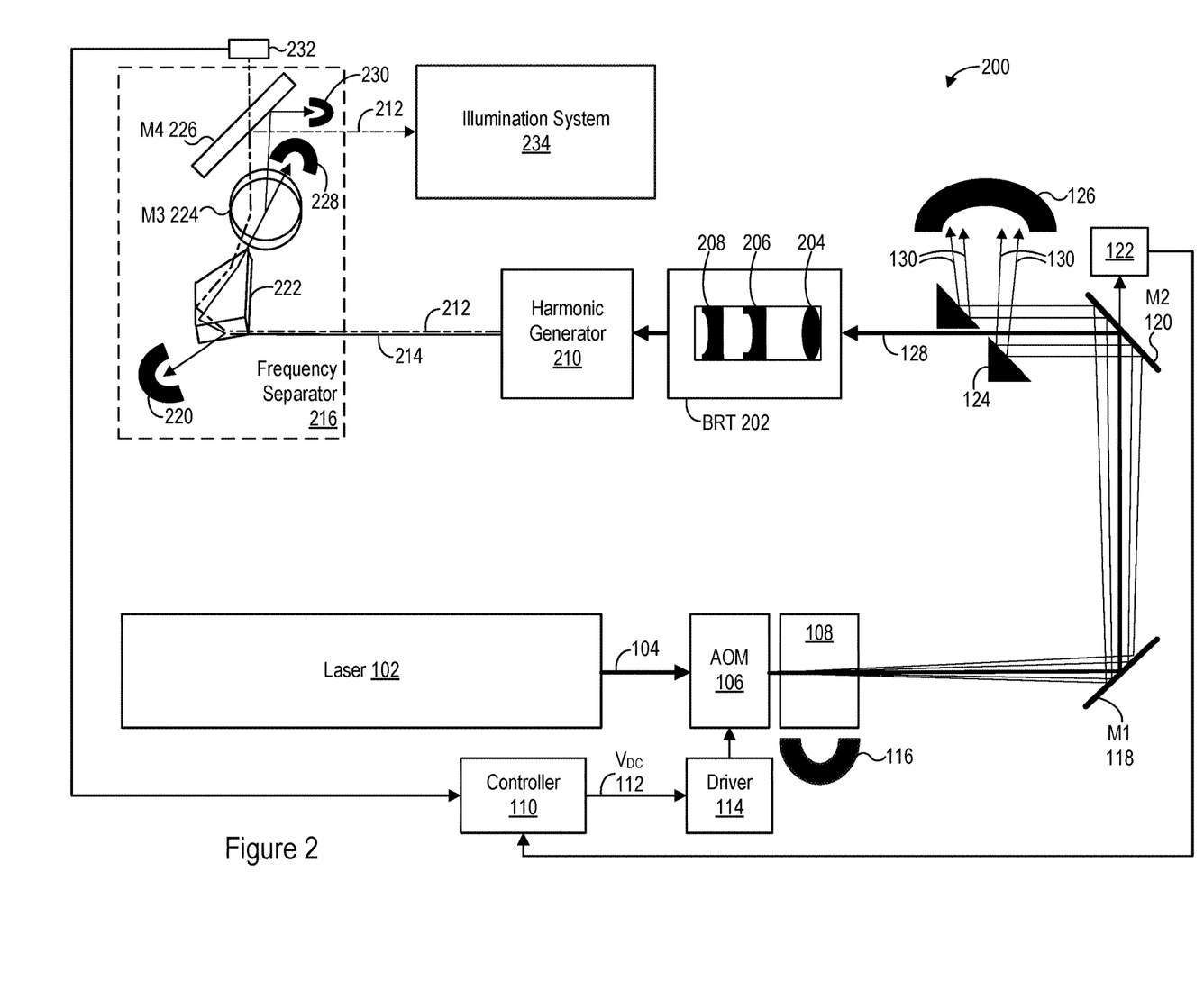
FIG. 2 is a diagram showing a laser-beam power-modulation system that includes the laser-beam power-modulation system of FIG. 1 and also includes a harmonic frequency-conversion stage, in accordance with some embodiments.

FIG. 2 is a diagram showing a laser-beam power-modulation system 200 that includes the laser-beam power-modulation system 100 (FIG. 1) and also includes a harmonic frequency-conversion stage, in accordance with some embodiments. A harmonic generator 210 converts a first portion of the primary beam 128 into a converted beam 212 that is a harmonic of the primary beam 128. The harmonic generator 210 also transmits a second portion 214 of the primary beam 128, because the conversion efficiency of the harmonic generator 210 is less than 100 percent. The harmonic generator 210 includes a non-linear optical crystal (e.g., a cesium-lithium-borate (CLBO) crystal). In some embodiments, the harmonic generator 210 is a fourth-harmonic generator: the frequency of the converted beam 212 may be four times the fundamental frequency of the laser beam emitted by the laser cavity in the laser 102, and twice the frequency of the primary beam 128. In some embodiments, the primary beam 128 is green and the converted beam 212 is ultraviolet (UV). For example, the primary beam 128 has a wavelength of 532 nm and the converted beam 212 has a wavelength of 266 nm.

In some embodiments, a beam-reducing telescope (BRT) 202 focuses the primary beam 128, as provided by the system 100, onto the harmonic generator 210. The beam-reducing telescope is situated between the slit 124 and the harmonic generator 210 in the path of the primary beam 128. The beam-reducing telescope 202 may change the shape of the beam spot for the primary beam 128 from round to elliptical. The beam-reducing telescope 202 may include a spherical lens 204 and a pair of cylindrical lenses 206 and 208, with the spherical lens 204 closest to the slit 124.

Because the converted beam 212 is a harmonic of the primary beam 128, it has a different frequency than the primary beam 128, and thus a different frequency than the second portion 214 of the primary beam 128. A frequency separator 216 receives the converted beam 212 and the second portion 214 of the primary beam, transmits the converted beam 212, and dumps the second portion 214 of the primary beam. The converted beam 212, as transmitted by the frequency separator 216, may be provided to an illumination system 234.

Figure 3:
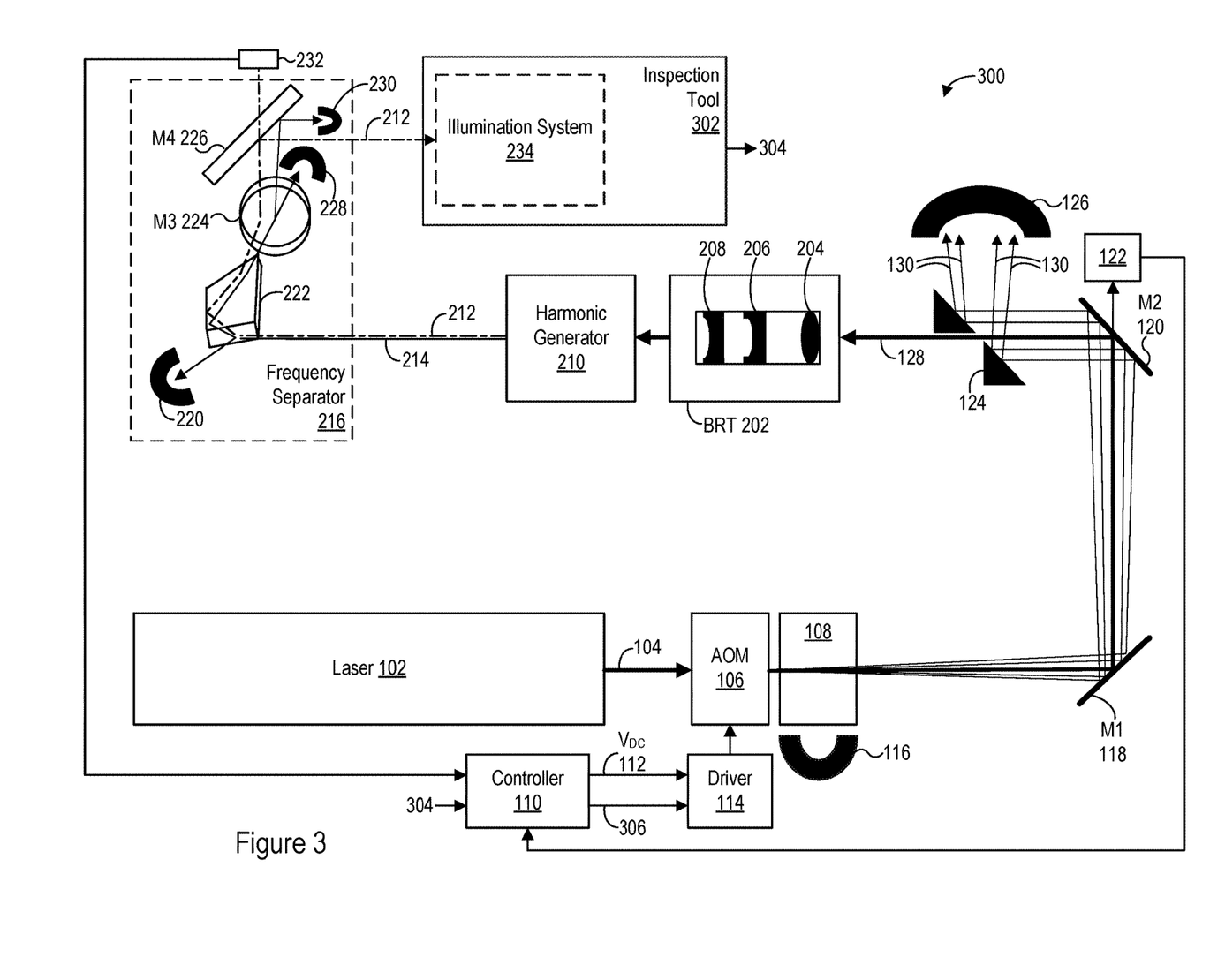
FIG. 3 is a diagram showing an example of the laser-beam power-modulation system of FIG. 2 that provides a laser beam to an inspection tool, in accordance with some embodiments.

In some embodiments, a sensor 232 (e.g., UV sensor 402, FIG. 4) receives light from the converted beam 212 that is leaked by the frequency separator 216. The power of the light leaked by the frequency separator 216 and sensed by the sensor 232 is related to (e.g., is a percentage of) the power of the converted beam 212. By sensing this light, the sensor 232 generates feedback indicative of the power of the converted beam 212 and provides this feedback to the controller 110. The controller 110 may generate the control signal 112 based at least in part on the feedback from the sensor 232. For example, the controller 110 may generate the control signal 112 using the feedback from both the sensor 232 and the sensor 122, or may generate the control signal 112 using the feedback from the sensor 232 but not the feedback from the sensor 122. Alternatively, the controller 110 may generate the control signal 112 using the feedback from the sensor 122 but not the feedback from the sensor 232. In some embodiments, the controller 110 filters noise (e.g., kilohertz-scale noise) from the feedback from the sensor 232 and/or the sensor 122 in the process of generating the control signal 112.

In some embodiments, the frequency separator 216 includes a Pellin-Broca prism 222, a third mirror (M3) 224, and a fourth mirror (M4) 226. The third mirror 224 is situated between the Pellin-Broca prism 222 and the fourth mirror 226 in the beam path of the converted beam 212. The Pellin-Broca prism 222 spatially separates the converted beam 212 from the second portion 214 of the primary beam. Also, the front surface of the Pellin-Broca prism 222 reflects part of the second portion 214 of the primary beam, directing it to a beam dump 220. The third mirror 224, which is dichroic, reflects the converted beam 212 while transmitting the second portion 214 of the primary beam to a beam dump 228, thereby dumping the second portion 214 of the primary beam.

By reflecting the converted beam 212, the third mirror 224 directs the converted beam 212 to the fourth mirror 226, which reflects the converted beam 212 and thereby transmits the converted beam 212 beyond the frequency separator 216. The third mirror 224 may also reflect some of (e.g., <5% of) the second portion 214 of the primary beam on a spatially separate path to the fourth mirror 226. The fourth mirror 226, which may also be dichroic, reflects some of (e.g., <5% of) this light from the second portion of the primary beam, directing it to a beam dump 230. The frequency separator 216 thus substantially dumps the second portion 214 of the primary beam (e.g., the green light that was not converted to UV by the harmonic generator 210) while transmitting the converted beam 212 (e.g., the UV light generated by the harmonic generator 210).

FIG. 3 is a diagram showing a laser-beam power-modulation system 300 in which the laser-beam power-modulation system 200 (FIG. 2) provides the converted beam 212 to a laser-scattering inspection tool 302, in accordance with some embodiments. The inspection tool 302 uses the converted beam 212 to inspect substrates (e.g., semiconductor wafers or reticles) for defects (e.g., particles). In the system 300, the illumination system 234 is an illumination system of the inspection tool 302.

In some embodiments, the inspection tool 302 performs an initial inspection with a low-power beam to determine whether a large defect (e.g., particle) is present on a substrate, before using the higher-power converted beam 212 to illuminate the substrate. A large defect is a defect with a size that satisfies (e.g., exceeds, or equals or exceeds) a threshold. The inspection tool 302 may use a photo-multiplier tube (PMT) as a sensor for imaging with the low-power beam, and may use a separate sensor (e.g., a time-delay-integration (TDI) sensor) for defect detection with the converted beam 212. The presence of a large defect may be determined based on a PMT signal amplitude (e.g., whether the PMT signal amplitude satisfies a threshold). In response to determining that a defect with a size that satisfies a threshold is present on the substrate, the inspection tool 302 provides (e.g., asserts) a signal 304 to the controller 110. The signal 304 (e.g., when asserted), which may be referred to as a fast laser-power-modulation (LPM) trigger, indicates that the size of the defect satisfies the threshold. In response to the indication by the signal 304 that the size of the defect satisfies the threshold, the controller 110 asserts a control signal 306 that is provided to the driver 114. The driver 114 generates the input signal provided to the AOM 106 based on the control signal 306 as well as the control signal 112. The AOM 106 temporarily decreases the power of the primary beam 128 in response to assertion of the control signal 306. For example, the driver 114 temporarily increases the RF power of the input signal in response to assertion of the control signal 306, causing the AOM 106 to diffract more of the laser beam 104, thereby attenuating the primary beam 128. This temporary attenuation of the primary beam 128 attenuates the converted beam 212, preventing ablation of the defect by the converted beam 212.

Figure 4:
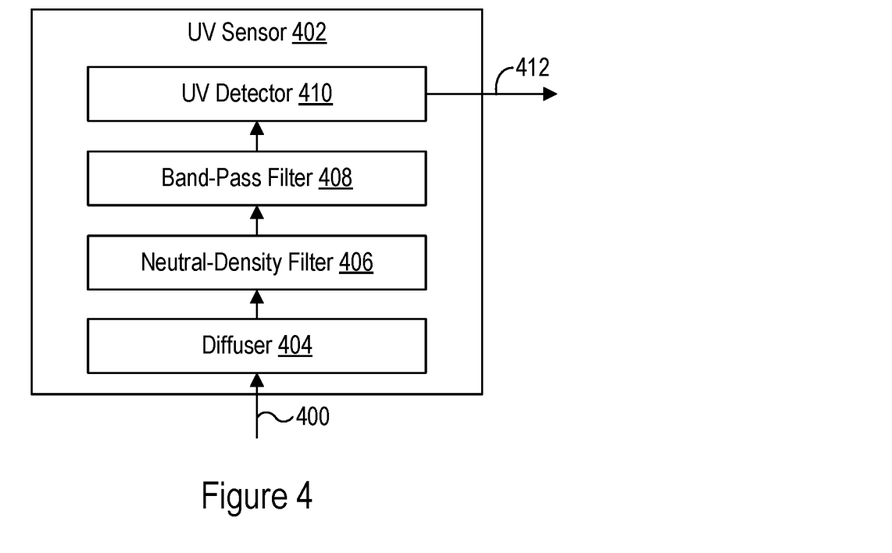
FIG. 4 is a block diagram of a UV sensor, in accordance with some embodiments.

FIG. 4 is a block diagram of a UV sensor 402, in accordance with some embodiments. The UV sensor 402 is an example of the sensor 232 (FIGS. 2-3). UV light 400 incident on the UV sensor 402 (e.g., leaked light from the converted beam 212, FIGS. 2-3) is softened by a diffuser 404 and then filtered by a neutral-density filter 406 and a band-pass filter 408 before being detected by a UV detector 410. The band-pass filter 408 passes (i.e., transmits) light at the wavelength of the converted beam 212 (e.g., 266 nm), in accordance with some embodiments. The UV detector 410 generates a feedback signal 412 based on the detected light and provides the feedback signal 412 to the controller 110 (FIGS. 2-3).

Figure 5:
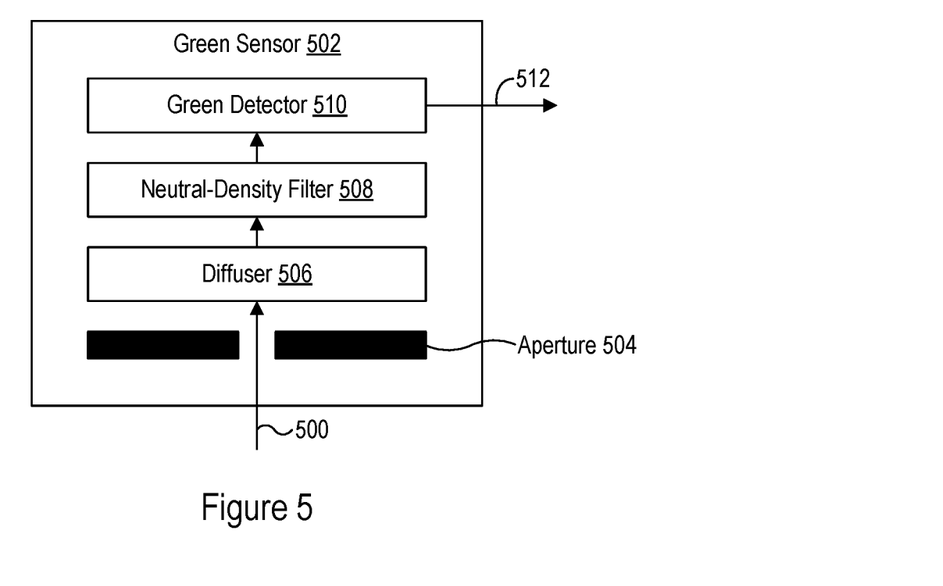
FIG. 5 is a block diagram of a green sensor, in accordance with some embodiments.

FIG. 5 is a block diagram of a green sensor 502, in accordance with some embodiments. The green sensor 502 is an example of the sensor 122 (FIGS. 1-3). An aperture 504 limits the green light 500 that may be received by the green sensor 502. For example, the aperture 504 allows leaked light from the primary beam 128 to enter the green sensor 502 and blocks leaked light from the plurality of diffracted beams 130 from entering the green sensor 502. The green light 500 that passes through the aperture 504 is softened by a diffuser 506 and filtered by a neutral-density filter 508 before being detected by a green detector 510. The green detector 510 generates a feedback signal 512 based on the detected light and provides the feedback signal 512 to the controller 110 (FIGS. 1-3).

Figure 6:
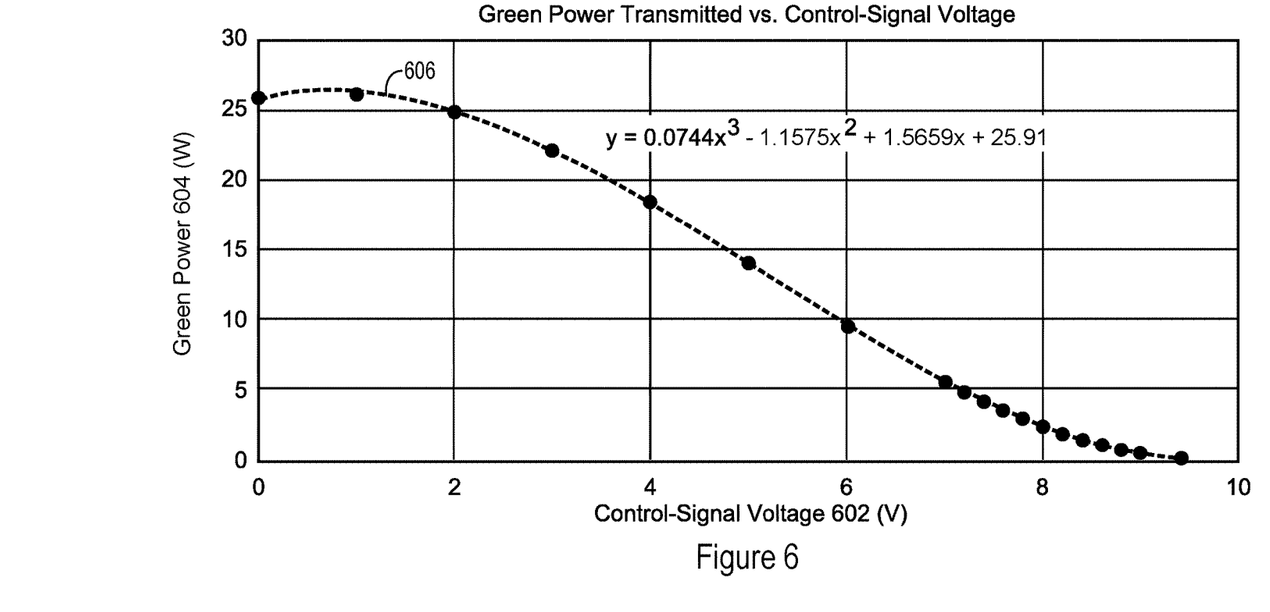
FIG. 6 is a graph showing an example of the power of a green primary beam versus a control-signal voltage, in accordance with some embodiments.
Figure 7:
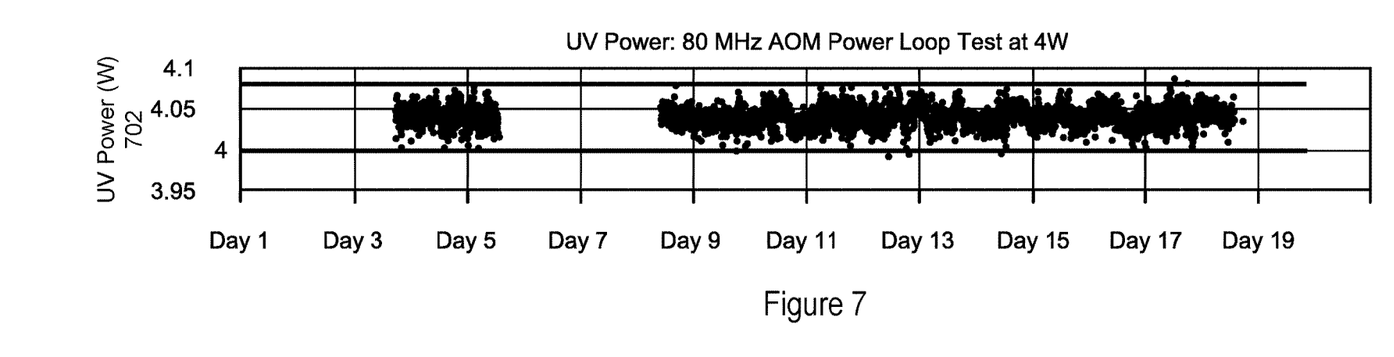
FIG. 7 is a graph showing results of a test spanning multiple days in which a driver provides RF power to an AOM to maintain the power of a laser beam.

FIG. 6 is a graph showing an example of the power 604 of a green primary beam 128 versus a control-signal voltage 602, in accordance with some embodiments. The control-signal voltage 602 is an example of the control signal 112 (FIGS. 1-3). The voltage dependence of the power 604 may be determined by fitting an appropriate curve 606 (e.g., a polynomial, as shown in FIG. 6) to the data points. The controller 110 may use the curve 606 (i.e., the curve-fit) to control the power 604, by controlling the AOM 106. For example, the controller 110 may set the control-signal voltage 602 to maintain the power 604 at a substantially constant value (e.g., to within one percent). Power (e.g., RF power) may be constantly supplied to the AOM 106 by the driver 114 (FIGS. 1-3) via the input signal, to maintain the power 604 of the primary beam 128 at the desired value. A similar curve may be generated for the converted beam 212. FIG. 7 shows results of a test spanning multiple days in which the driver 114 provides RF power at 80 MHz to the AOM 106 to maintain the power 702 of the converted beam 212 (which is UV at 266 nm in this test) at 4 W. In this test, the sensor 122 was situated behind the first mirror 118 instead of the second mirror 120. These results show typical power noise of less than one percent. Effective control of the primary beam 128 and converted beam 212 is achieved without moving parts (e.g., rotary mounts) and without modulating pump diodes in the laser 102.

Figure 8:
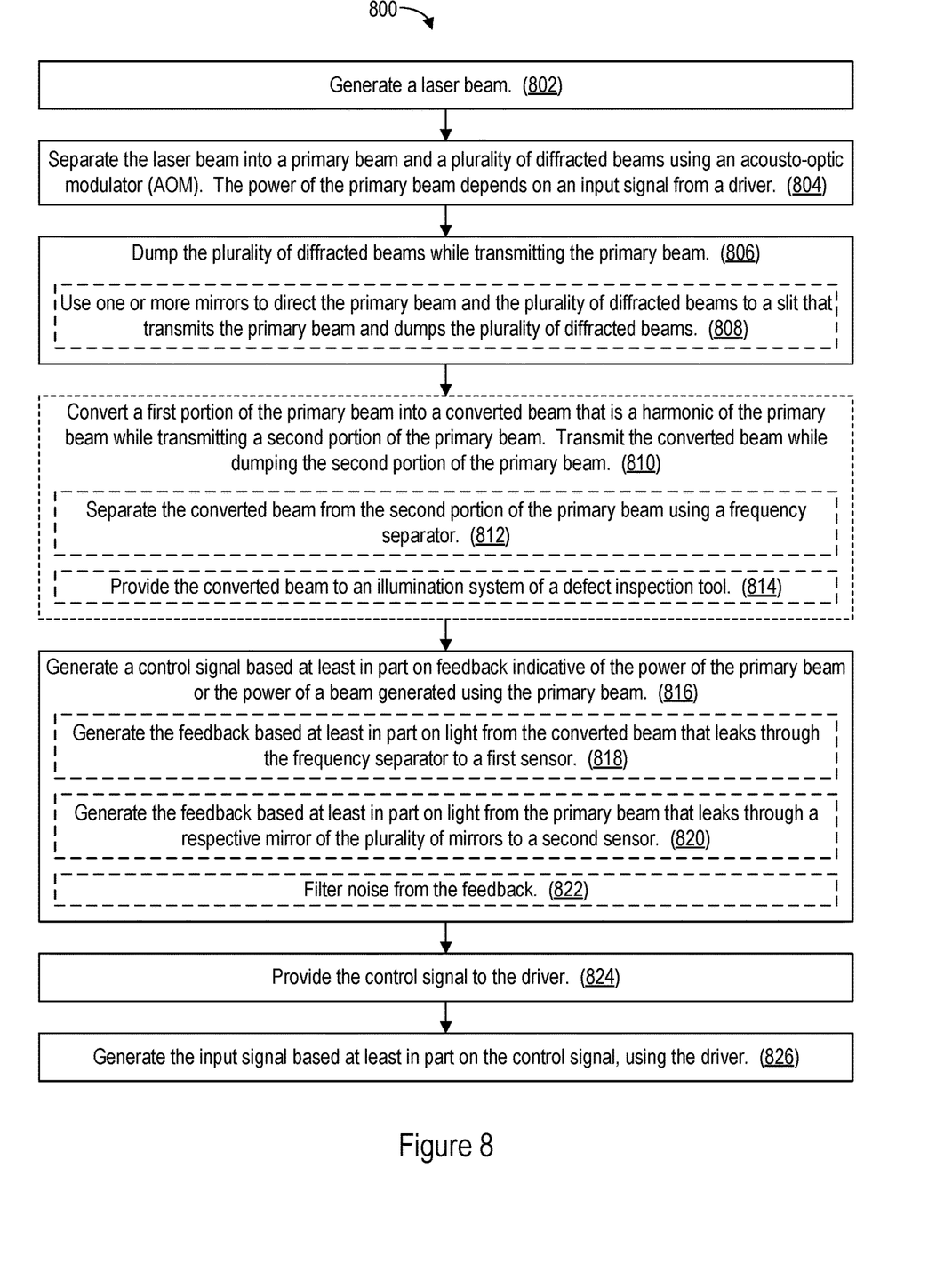
FIG. 8 is a flowchart of a method of modulating laser-beam power with an AOM, in accordance with some embodiments.

FIG. 8 is a flowchart of a method 800 of modulating laser-beam power, in accordance with some embodiments. In the method 800, a laser beam (e.g., laser beam 104, FIGS. 1-3) is generated (802) (e.g., by the laser 102, FIGS. 1-3). The laser beam is separated (804) into a primary beam (e.g., primary beam 128, FIGS. 1-3) and a plurality of diffracted beams (e.g., plurality of diffracted beams 130, FIGS. 1-3) using an AOM (e.g., AOM 106, FIGS. 1-3). The power of the primary beam depends on an input signal (e.g., an RF signal) from a driver (e.g., driver 114, FIGS. 1-3).

The plurality of diffracted beams is dumped (806) while the primary beam is transmitted. In some embodiments, one or more mirrors (e.g., first mirror 118 and second mirror 120, FIGS. 1-3) are used (808) to direct the primary beam and the plurality of diffracted beams to a slit (e.g., slit 124, FIGS. 1-3) that transmits the primary beam and dumps the plurality of diffracted beams.

In some embodiments, a first portion of the primary beam is converted (810) into a converted beam (e.g., converted beam 212, FIGS. 2-3) that is a harmonic of the primary beam (e.g., a fourth harmonic of the fundamental wavelength of the laser cavity used in step 802) (e.g., with twice the frequency of the primary beam) while a second portion of the primary beam (e.g., second portion 214, FIGS. 2-3) is transmitted (e.g., by harmonic generator 210, FIGS. 2-3). The converted beam is subsequently transmitted while the second portion of the primary beam is dumped. In some embodiments, the converted beam is separated (812) from the second portion of the primary beam using a frequency separator (e.g., frequency separator 216, FIGS. 2-3), which dumps the second portion of the primary beam while transmitting the converted beam. In some embodiments, the converted beam is provided (814) to an illumination system of a defect inspection tool (e.g., illumination system 234 of inspection tool 302, FIG. 3).

A control signal is generated (816) based at least in part on feedback indicative of the power of the primary beam or the power of a beam generated using the primary beam (e.g., the converted beam of step 810). For example, the controller 110 (FIGS. 1-3) generates the control signal 112. In some embodiments, the feedback is generated (818) based at least in part on light from the converted beam that leaks through the frequency separator to a first sensor (e.g., sensor 232, FIGS. 2-3), which is an example of generating the control signal based at least in part on feedback indicative of the power of the beam generated using the primary beam. In some embodiments, the feedback is generated (820) based at least in part on light from the primary beam that leaks through a respective mirror (e.g., second mirror 120, FIGS. 1-3) of the plurality of mirrors to a second sensor (e.g., sensor 122, FIGS. 1-3), which is an example of generating the control signal based at least in part on feedback indicative of the power of the primary beam.

In some embodiments, the control signal is generated based at least in part on the feedback indicative of the power of the primary beam and the feedback indicative of the power of the beam generated using the primary beam (e.g., the converted beam). For example, the control signal may be generated using the feedback of step 818 and the feedback of step 820 (i.e., steps 818 and 820 are both included in the method 800). The primary beam may be green, the converted beam may be ultraviolet, the first sensor may be a UV sensor (e.g., UV sensor 402, FIG. 4), and the second sensor may be a green sensor (e.g., green sensor 502, FIG. 5).

In some embodiments, to generate the control signal, noise (e.g., kilohertz-scale noise) is filtered (822) from the feedback. Noise contributions include intrinsic laser noise, noise from the harmonic conversion, sensor noise (e.g., from the first and/or second sensors of steps 818 and 820), and noise from the modulation (e.g., DC modulation) of the AOM driver. The filtering may be performed using two loops, an inner loop and an outer loop. The inner loop averages feedback signals and stores the results in an array. The output loop sorts the array and periodically selects the median beam-power value(s) of the array. The value of the control signal may be determined based on the median value(s).

The control signal is provided (824) to the driver. Using the driver, the input signal is generated (826) based at least in part on the control signal. The input signal is provided to the AOM.

In some embodiments, the control signal of step 816 is a first control signal and transmitting the converted beam in step 810 includes providing the converted beam to the illumination system of the defect inspection tool (e.g., illumination system 234 of inspection tool 302, FIG. 3). The method 800 may further include asserting a second control signal (e.g., control signal 306, FIG. 3) in response to a signal (e.g., signal 304, FIG. 3) from the defect inspection tool indicating that the size of a defect on a substrate satisfies a threshold. The input signal is generated in step 826 based on the first control signal and the second control signal. The AOM temporarily decreases the power of the primary beam in response to assertion of the second control signal, resulting in corresponding attenuation of the converted beam. For example, the driver temporarily increases the RF power of the input signal in response to assertion of the second control signal, causing the AOM to diffract more of the laser beam, thereby attenuating the primary beam.

The controller 110 (FIGS. 1-3) includes processor circuitry and may include embedded non-volatile memory that stores instructions (e.g., one or more programs) for execution by the processor circuitry. For example, the controller 110 may be a microcontroller with embedded flash memory or other non-volatile memory. Alternatively, the controller is coupled to separate non-volatile memory that stores instructions for execution by the processor circuitry. The non-volatile memory, whether embedded in or coupled to the controller 110, is an example of a non-transitory computer-readable storage medium. The instructions, when executed by the processing circuitry, cause the controller 110 to implement the functions described for the controller 110 herein (e.g., generating the control signal(s), which may include filtering feedback).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A laser-beam power-modulation system, comprising:
an acousto-optic modulator to receive a laser beam and separate the laser beam into a primary beam and a plurality of diffracted beams based on an input signal, wherein the power of the primary beam depends on the input signal;
a slit to transmit the primary beam and dump the plurality of diffracted beams;
a controller to generate a control signal based at least in part on feedback indicative of the power of the primary beam or the power of a beam generated using the primary beam; and
a driver to generate the input signal, based at least in part on the control signal.

2. The system of claim 1, further comprising:
one or more mirrors to direct the primary beam and the plurality of diffracted beams toward the slit; and
a sensor to receive light from the primary beam leaked by a respective mirror of the one or more mirrors and to provide the feedback indicative of the power of the primary beam based on the received light;
wherein the controller is to generate the control signal based at least in part on the feedback indicative of the power of the primary beam.

3. The system of claim 2, wherein:
the one or more mirrors comprise a first mirror and a second mirror;
the first mirror is situated between the acousto-optic modulator and the second mirror in the optical paths of the primary beam and the plurality of diffracted beams; and
the second mirror is the respective mirror from which the sensor is to receive the leaked light from the primary beam.

4. The system of claim 2, further comprising an attenuator situated between the acousto-optic modulator and the one or more mirrors in the optical paths of the primary beam and the plurality of diffracted beams.

5. The system of claim 1, wherein:
the driver is a radio-frequency (RF) driver; and
the input signal is an RF signal.

6. The system of claim 1, wherein the control signal is a direct-current (DC) voltage.

7. The system of claim 6, wherein, to generate the control signal, the controller is to filter noise from the feedback.

8. The system of claim 1, further comprising a beam dump, wherein the slit comprises a pair of mirrors to direct the plurality of diffracted beams to the beam dump, the pair of mirrors being separated by a gap to transmit the primary beam.

9. The system of claim 1, further comprising:
a harmonic generator to convert a first portion of the primary beam into a converted beam that is a harmonic of the primary beam and to transmit a second portion of the primary beam; and
a frequency separator to receive the converted beam and the second portion of the primary beam, transmit the converted beam, and dump the second portion of the primary beam.

10. The system of claim 9, wherein the harmonic generator is a fourth harmonic generator.

11. The system of claim 9, further comprising a beam-reducing telescope, situated between the slit and the harmonic generator in the optical path of the primary beam, to focus the primary beam onto the harmonic generator.

12. The system of claim 9, wherein:
the converted beam is the beam generated using the primary beam;
the system further comprises a sensor to receive light from the converted beam leaked by the frequency separator and to provide the feedback indicative of the power of the beam generated using the primary beam; and
the controller is to generate the control signal based at least in part on the feedback indicative of the power of the beam generated using the primary beam.

13. The system of claim 12, wherein the primary beam is green, the converted beam is ultraviolet, and the sensor is an ultraviolet sensor.

14. The system of claim 12, wherein the frequency separator comprises:
a Pellin-Broca prism to separate the converted beam from the second portion of the primary beam;
a first, dichroic mirror to reflect the converted beam and transmit at least some of the second portion of the primary beam; and
a second mirror to reflect the converted beam and leak the light from the converted beam to the sensor;
wherein the first, dichroic mirror is situated between the Pellin-Broca prism and the second mirror in the beam path of the converted beam.

15. The system of claim 12, wherein the sensor is a first sensor, the system further comprising:
one or more mirrors to direct the primary beam and the plurality of diffracted beams toward the slit; and
a second sensor to receive light from the primary beam leaked by a respective mirror of the one or more mirrors and to provide the feedback indicative of the power of the primary beam based on the received light;
wherein the controller is to generate the control signal based at least in part on the feedback indicative of the power of the primary beam and the feedback indicative of the power of the beam generated using the primary beam.

16. The system of claim 15, wherein the primary beam is green, the converted beam is ultraviolet, the first sensor is an ultraviolet sensor, and the second sensor is a green sensor.

17. The system of claim 12, wherein:
the frequency separator is to provide the converted beam to an illumination system of a defect inspection tool;
the control signal is a first control signal;
the controller is to assert a second control signal in response to a signal from the defect inspection tool indicating that the size of a defect on a substrate satisfies a threshold; and
the driver is to generate the input signal based on the first control signal and the second control signal, wherein the acousto-optic modulator is to temporarily decrease the power of the primary beam in response to assertion of the second control signal.

18. A method, comprising:
separating a laser beam into a primary beam and a plurality of diffracted beams using an acousto-optic modulator, wherein the power of the primary beam depends on an input signal from a driver;
dumping the plurality of diffracted beams while transmitting the primary beam;

generating a control signal based at least in part on feedback indicative of the power of the primary beam or the power of a beam generated using the primary beam;

providing the control signal to the driver; and generating the input signal based at least in part on the control signal, using the driver.

19. The method of claim 18, wherein:

dumping the plurality of diffracted beams while transmitting the primary beam comprises using one or more mirrors to direct the primary beam and the plurality of diffracted beams to a slit that transmits the primary beam and dumps the plurality of diffracted beams;

generating the control signal is performed based at least in part on the feedback indicative of the power of the primary beam; and the method further comprises generating the feedback indicative of the power of the primary beam based on light from the primary beam that leaks through a respective mirror of the plurality of mirrors to a sensor.

20. The method of claim 18, wherein generating the control signal comprises filtering noise from the feedback.

21. The method of claim 18, further comprising:

converting a first portion of the primary beam into a converted beam that is a harmonic of the primary beam while transmitting a second portion of the primary beam; and transmitting the converted beam while dumping the second portion of the primary beam.

22. The method of claim 21, wherein:

the converted beam is the beam generated using the primary beam;

generating the control signal is performed based at least in part on the feedback indicative of the power of the beam generated using the primary beam;

transmitting the converted beam while dumping the second portion of the primary beam comprises separating the converted beam from the second portion of the primary beam using a frequency separator; and the method further comprises generating the feedback indicative of the power of the beam generated using the primary beam based on light from the converted beam that leaks through the frequency separator to a sensor.

23. The method of claim 22, wherein:

the sensor is a first sensor;

dumping the plurality of diffracted beams while transmitting the primary beam comprises using one or more mirrors to direct the primary beam and the plurality of diffracted beams to a slit that transmits the primary beam and dumps the plurality of diffracted beams;

generating the control signal is performed based at least in part on the feedback indicative of the power of the primary beam and the feedback indicative of the power of the beam generated using the primary beam; and the method further comprises generating the feedback indicative of the power of the primary beam based on light from the primary beam that leaks through a respective mirror of the plurality of mirrors to a second sensor.

24. The method of claim 23, wherein the primary beam is green, the converted beam is ultraviolet, the first sensor is an ultraviolet sensor, and the second sensor is a green sensor.

25. The method of claim 22, wherein:

transmitting the converted beam comprises providing the converted beam to an illumination system of a defect inspection tool;

the control signal is a first control signal;

the method further comprises asserting a second control signal in response to a signal from the defect inspection tool indicating that the size of a defect on a substrate satisfies a threshold;

the input signal is generated based on the first control signal and the second control signal; and the acousto-optic modulator temporarily decreases the power of the primary beam in response to assertion of the second control signal.

* * * * *